United States Patent
Sukhman et al.

(10) Patent No.: US 6,424,670 B1
(45) Date of Patent: Jul. 23, 2002

(54) APPARATUS AND METHOD FOR MAKING LASER SOURCES AND LASER PLATFORMS INTERCHANGEABLE AND INTERFACEABLE

(75) Inventors: Yefim P. Sukhman; Christian J. Risser, both of Scottsdale; Edwin W. Gorham, Phoenix; Stanfano J. Noto, Mesa, all of AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/506,214

(22) Filed: Feb. 17, 2000

(51) Int. Cl.[7] .......................... H01S 3/08; B23K 26/00; B23K 26/14
(52) U.S. Cl. ............. 372/107; 219/121.67; 219/121.76; 219/121.6
(58) Field of Search ................. 372/107, 108; 219/121.67, 121.76, 121.78, 121.6

(56) References Cited

U.S. PATENT DOCUMENTS

| | | | |
|---|---|---|---|
| 4,550,240 A | 10/1985 | Toida et al. | 219/121 LS |
| 4,985,166 A | 1/1991 | Morrow | 330/4.3 |
| 4,985,780 A | 1/1991 | Garnier et al. | |
| H933 H | 7/1991 | Buczek et al. | 356/5 |
| 5,168,454 A | 12/1992 | LaPlante et al. | 364/474.08 |
| 5,191,447 A | 3/1993 | Pinard | 358/497 |
| 5,260,565 A | 11/1993 | Rose et al. | 250/227.15 |
| 5,319,528 A | 6/1994 | Raven | 362/32 |
| 6,014,206 A | * 1/2000 | Basting | 356/138 |
| 6,134,050 A | 10/2000 | Conemac | 359/618 |

* cited by examiner

Primary Examiner—Paul Ip
Assistant Examiner—Armando Rodriquez
(74) Attorney, Agent, or Firm—Abelman, Frayne & Schwab

(57) ABSTRACT

The beam path [80] of a laser source [10] is first pre-aligned to a predetermined reference, and then the optical axis [90] of the beam delivery system [40, 50] of a laser material processing platform [20] is pre-aligned to the pre-aligned beam path of the laser source such that the two coincide. If the laser beam [80] is invisible, a laser simulator [72] having a visible pre-aligned beam may be used instead. When every laser source and every laser material processing platform [20] in a predetermined population thereof are pre-aligned in this manner, then any one of the laser sources and any one of the laser material processing platforms in the population may be interchanged for any one of its kind in the population and interfaced with any one of the other kind in the population to form a laser material processing system without any additional alignment requirement during or after the interfacing operation and the laser beam paths [80] and beam delivery system optical axes [90] will be automatically aligned with each other after any laser source in the line is combined with any laser material processing platform in the line.

11 Claims, 5 Drawing Sheets

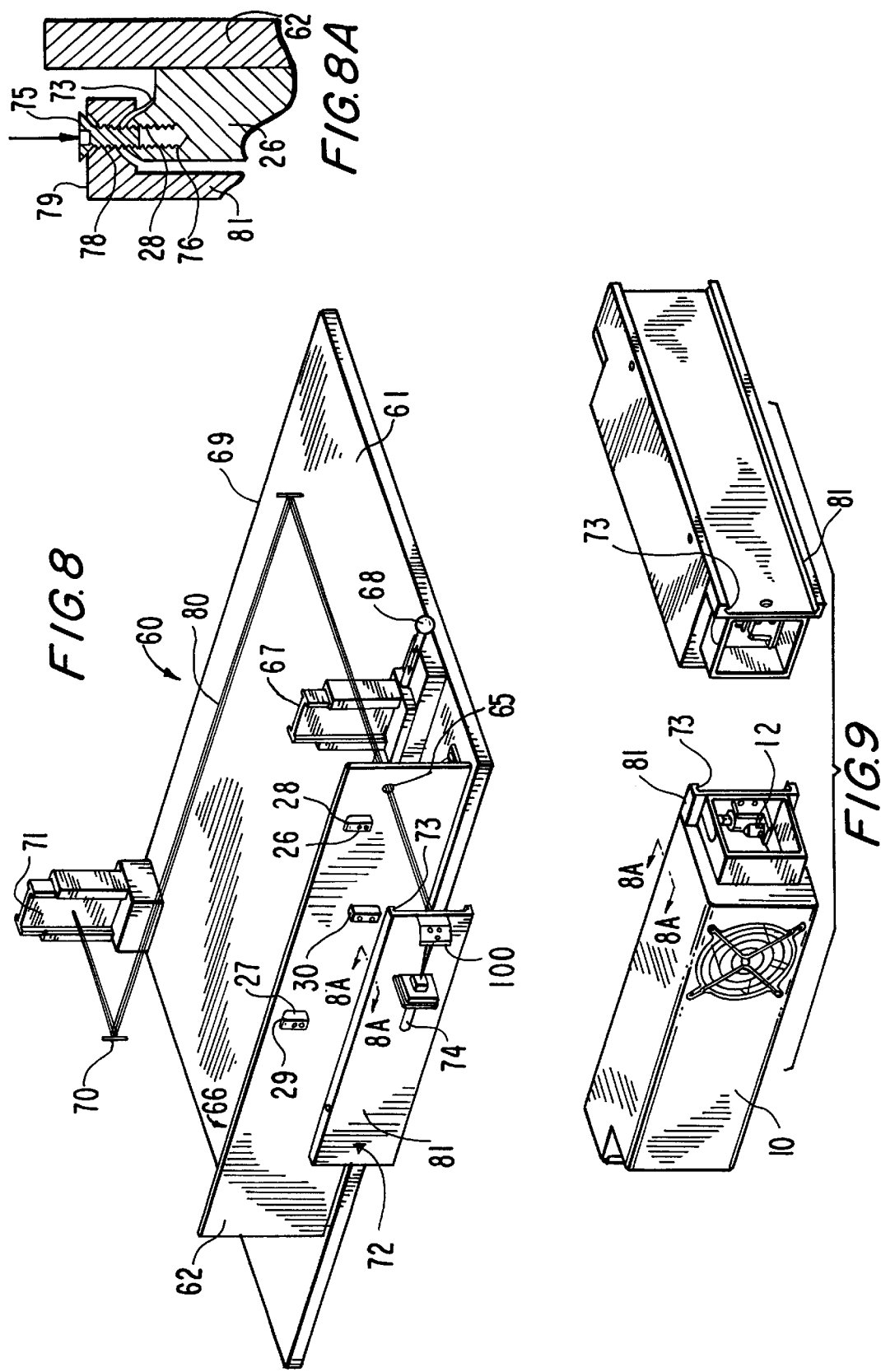

APPARATUS AND METHOD FOR MAKING LASER SOURCES AND LASER PLATFORMS INTERCHANGEABLE AND INTERFACEABLE

CROSS-REFERENCES TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Fields of the Invention

The present invention relates generally to apparatuses and methods of pre-aligning a laser source and a laser platform, and, more particularly, to pre-aligning a plurality of laser sources each of which has different operating parameters and pre-aligning a plurality of laser material processing platforms each of which has different operating parameters such that any of the laser sources are interchangeable with each other, any of the laser material processing platforms are interchangeable with each other, and any of the laser sources and any of the laser material processing platforms are interfaceable with each other to form a laser material processing system, all without the need for any alignment adjustment during or after any interfacing of the one with the other.

2. Discussion of Background and Prior Art a. Widespread Laser Material Processing Applications

There are many general types of lasers, including, for example, $CO_2$, mercury vapor, ion, nitrogen, die, ruby, and Nd YAG. Lasers have been employed in a wide of industries, including electronics, graphic arts, automotive, and defense, to name just a few. Lasers have been employed in many conventional uses including, cutting (hard or soft materials at high speed or high power or both with accuracies of thousandths of an inch), cladding, drilling, marking, thermal processing, and welding.

In recent years laser materials processing has grown into an enormous industry. In particular, the $CO_2$ and Nd YAG lasers have been especially popular and have emerged as leading laser types. The laser material processing systems handle a wide variety of materials that can be utilized in many different applications and industries. Whether your need is to create a single prototype or to mass produce thousands of items, laser systems make it easy.

The laser technology is now routinely used to perform a wide variety of non-contact work tasks on a wide variety of materials. The lists are truly endless. For example:

1. A few of the routine laser applications are aerospace components, architectural models, awards/plaque engraving, control panels, decorative etching, deep engraving, desk accessories, diamond scribing, drilling, film/overlay cutting, flexible circuits, flexo-plate production, gasket cutting, medical component marking, membrane switches, metal marking, model making, name badges/id tags, non-contact cutting, part identification/serialization, plastics de-gating, precision scribing, prototyping, rubber stamp & seals, sign making, specialty advertising, stencil making, template & mask production, and textile cutting.

2. A few of the materials which are routinely laser processed are acrylic, anodized aluminum, carbide, cardboard, ceramic substrates, circuit boards, coated metals, composites, fabrics, fiberglass, foam, glass, kevlar, laminated plastics, leather, marble, masonite, matte board, meat, melamine, metal, nylon, paper, plastics, polycarbonate, polyester, pressboard, quartz, rubber, silicon, stone, vinyl, and wood.

Thus, in summary, many problems which require controlled laser material processing might find a potential solution with the $CO_2$ orNd YAG laser.

b. Types Of Beam Delivery Systems

Typically, small, compact, $CO_2$ and Nd YAG lasers, are used in many, if not most, of the applications described above. Such lasers are typically installed in a laser platform which provides a sturdy table, in an enclosure with access for loading and unloading a workpiece on which the laser is to perform a work task. Typically such a laser material processing system includes a mounting plate onto which the laser cartridge is mounted, a power supply, a CPU for receiving a computer program to control the work assignment, a control panel, and a beam delivery system.

1. One typical embodiment of an X-Y beam delivery system includes parallel tracks supporting a transverse rail having a reciprocable carriage with a mirror and focusing lens assembly which delivers the laser beam downwardly onto the workpiece secured on the work table in accordance with the work program. See, Gamier U.S. Pat. No. 4,985,780 hereby incorporated herein by reference.

2. Another type of beam delivery system is known in the art as a Galvanometer type wherein two mirrors are each supported on orthogonally placed axes of limited-rotation, moving iron type, servo motors with highly linear torque characteristics over a relatively large rotation angle with capacitively sensed position feedback to the servo amplifier. The combined action of the mirrors and servo motors produces X and Y movements of the laser beam. Each of the motion mechanisms described above is designed to maintain very high production rates.

Typically, such a laser material processing system also includes, a lift system to raise and lower the table for focusing the laser beam while giving solid support and stability to the table and workpiece, and an exhaust system to remove smoke, fumes, and debris.

C. The Problem: An Alignment Is Required After Interfacing A Laser Source With A Laser Platform As the growth in the use of lasers has exploded, businesses which use lasers in their facilities have grown both in volume and in diversity of applications. This cause and effect relationship has mandated not only that such businesses purchase more laser sources and laser platforms of the kind already in use in their facilities (i.e.,, redundant systems), but also, additional laser sources with different operating parameters (e.g., power) and additional laser platforms with different characteristics (e.g., size, speed, ergonomics, and controls) (i.e., diversified systems) so that the businesses could better mix and match laser power and platform characteristics to the material processing requirements of the particular application.

Thus, there is an unfilled need for, and it is an object of the present invention to provide, laser sources and laser material processing platforms which are rapidly interchangeable and interfaceable such that a small business can enter the laser material processing field with the smallest laser source and laser material processing platform, add more powerful laser sources and bigger laser material processing platforms as their business grows, and are able to rapidly reconfigure the components in their line to form laser material processing systems that can process any one of a wide variety of materials with optimal performance and great efficiency.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein. Applicants' invention includes independently both the apparatus and the methods described herein which achieve the objects and benefits of the present invention. Both formats of the invention are described below, and it is applicants' intention to claim both formats even though from time to time below for purposes of clarity and brevity applicants will use either one or the other format to describe various aspects and features of the invention.

One aspect of the invention is a laser source having a beam path which coincides with an optical axis of a beam delivery system of each laser material processing platform in a line including the optical axis of the beam delivery system of each laser material processing platform in the line aligned to a predetermined. reference, and the beam path of the laser source coinciding with the optical axis of a beam delivery system of one laser material processing platform in the line.

A second aspect of the invention is a laser material processing platform having a beam delivery system the optical axis of which coincides with the beam path of each laser source in a line including the beam path of each of the laser sources in the line aligned to a predetermined reference, and the optical axis of the beam delivery system of the laser material processing platform coinciding with the beam path of one of the laser sources in the line.

A third aspect of the invention is a line of laser sources and laser material processing platforms in which the beam path of any laser source in the line coincides with the optical axis of a beam delivery system of any laser material processing platform in the line when any one of the laser sources is combined with any one of the laser material processing platforms to form a laser material processing system including the beam path of each of the laser sources in the line pre-aligned to a predetermined reference, and the optical axis of the beam delivery system of each laser material processing platform in the line pre-aligned to the same reference.

A fourth aspect of the invention is a line of laser material processing systems including every laser source and every laser material processing platform in the line having been independently pre-aligned to a predetermined reference whereby any one of the laser sources and any one of the laser material processing platforms in the line may be interchanged for any one of its kind in the line and interfaced with any one not of its kind in the line without any additional alignment requirement during or after the interchange or interface step.

A fifth aspect of the invention is a line of a predetermined population of laser material processing systems including a plurality of laser sources and a plurality of laser material processing platforms including the beam path of each laser source in the line and the optical axis of each laser material processing platform in the line pre-aligned to a predetermined reference whereby any one of the laser sources and any one of the laser material processing platforms in the population may be interchanged for any one of its kind in the population and interfaced with any one not of its kind in the population and have their respective beam paths and optical axes coincide without performing an additional beam path or optical axis alignment step.

The advantages of the invention include the following:

1. Interchangeability of any one of a line of laser sources and interchangeability of any one of a line of laser material processing platforms under any circumstances with the assurance that the interchanged unit will be automatically in alignment with the replaced unit.
2. Interfaceability of any one of a line of laser sources with any one of a line of laser material processing platforms to form laser material processing systems under any circumstances with the assurance that when interfaced with each other they will be automatically in alignment.
3. Rapid reconfiguration of the laser systems in the field.
4. Increased flexibility in customizing laser material processing systems of a line to an application.
5. Optimized systems performance on the workpiece.
6. Expanded utility of capital equipment. For example, laser engraving shops can now provide a broad range of laser material processing services, such as, cutting, de-gating, and marking.
7. Reduced setup costs.
8. Decreased down time.
9. Enhanced productivity.
10. Increased profit-making opportunities.

BRIEF DESCRIPTION OF THE SEVERAL VIEWS DRAWINGS

FIG. 8 is a perspective view of one embodiment of a pre-alignment fixture of the present invention suitable for use on a workbench showing an upturned ridge of a mounting member on the fixture supporting a downturned V-groove of a mounting member on a laser simulator of the present invention being pre-aligned.

FIG. 8A is an end elevation sectional view of a laser simulator having a downturned V-groove for mounting on the upturned ridge on the mounting member on the pre-alignment fixture of FIG. 8 or beam delivery systems of FIGS. 7, 10.

FIG. 9 is a perspective view of the laser source of FIG. 1 showing the downturned V-groove for mounting the laser source on the pre-alignment fixture of FIG. 8 or beam delivery systems of FIGS. 7, 10.

DETAILED DESCRIPTION OF THE INVENTION

Figure 10:
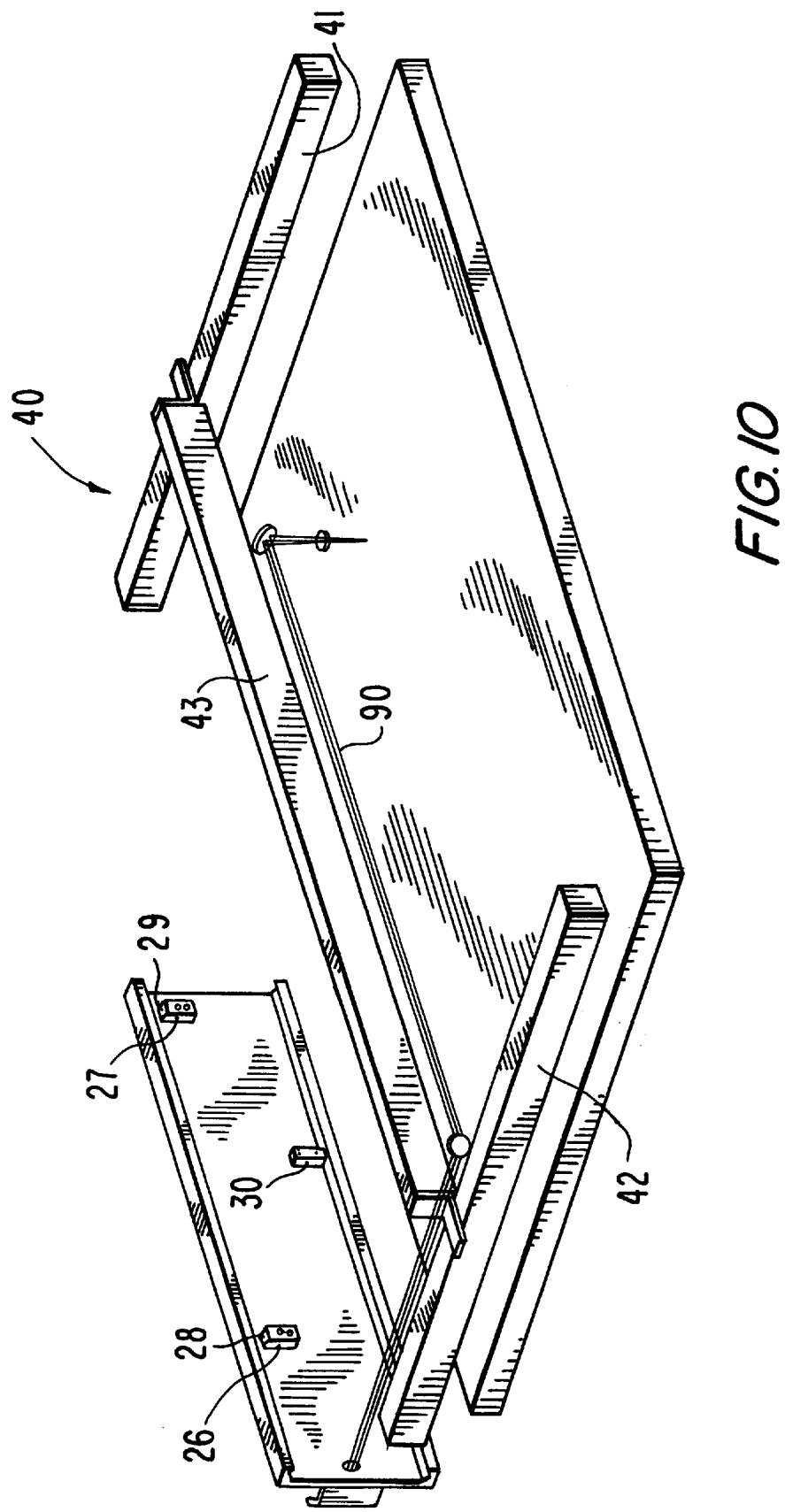
FIG. 10 is a schematic view of the X-Y beam delivery system in the laser material processing system of FIG. 2 being aligned by the laser simulator of FIG. 8.

1. General Description Of The Laser Source And Laser Material Processing Platform of the Present Invention As seen in FIGS. 1–7, the laser source and laser material processing platform of the present invention include a small, compact, $CO_2$ laser source 10 (FIG. 1), in a laser platform 20 (FIG. 2) which has a sturdy table 33 (FIG. 3), in a large, wheeled 21 cabinet or enclosure 22 with large top 23 and front 24 doors which provide ample access for loading and unloading small or oversize workpieces. The platform 20 includes a back mounting plate 25 (FIG. 4) which includes mounting members 26,27 with upturned ridges 28,29 and spacer block 30 (FIGS. 7, 10) onto which the portable laser cartridge 10 (FIG. 4) is mounted, a power supply 31, a CPU 32 for receiving a computer program to control the work assignment, a control panel 34, and an X-Y beam delivery system 40 (FIG. 10). Spacer bar 30 allows laser source 10 (FIG. 4), and laser simulator 72 (FIGS. 8,8A) to be supported in a vertical plane on mounting members 26, 27. The beam delivery system 40 (FIG. 10) includes, in one embodiment, parallel tracks 41, 42 supporting a transverse rail 43 (Y-motion) (FIGS. 5, 10) having a reciprocable carriage 44 (FIGS. 5, 6) with a mirror assembly 45 with focusing lens 46 (X-motion) which delivers the laser beam downwardly onto the workpiece secured on the work table 33 in accordance with the work program. In another embodiment, an alternative beam delivery system may include a Galvanometer type scanner 50 (FIG. 7) which has its two mirrors 51, 52 each supported on orthogonally placed axes 53, 54 of limited-rotation, moving iron type, servo motors 55, 56. The combined action of the mirrors 51, 52 and servo motors 55, 56 produces X and Y movements of the laser beam 80. Each of the beam delivery systems 40, 50 described above is designed to maintain very high production rates.

Laser platforms 20 also include, a lift system (not shown) which allows adjustment of the table 33 to an operate position which places the workpiece in the focal plane of the focusing lens 46 (FIG. 6) while giving solid support and stability to the table and workpiece, and an exhaust system (not shown) to remove smoke, fumes, and debris.

2. The Pre-Alignment Fixture

As seen in FIG. 8 one embodiment of a pre-alignment fixture 60 of the present invention which is suitable for use on a shop workbench includes a base 61 on which is supported a mounting plate 62 having one or more mounting members 26, 27 having upturned ridges 28, 29 and a spacer block 30, an aperture 65 through which the beam 80 passes for use as a mounting location 66, a slidably 68 adjustable near field target 67 (movable out of the beam path 80 when aligning the beam in the far field), a first 90° turning mirror 69, a second 90° turning mirror 70, and a far field target 71. As seen in FIGS. 8, 8A the laser simulator 72 has a support plate 81 having a flange 79 which has a downwardly turned V-groove shaped mounting member 73 and a screw 75 through countersunk hole 78 in flange 79 of the simulator support plate 81 and threaded hole 76 in mounting member 26 for providing horizontal alignment of the beam 80 through aperture 65. A visible laser diode 74 as a laser simulator and an adjustable 90° turning mirror 100 is also supported on plate 81. As seen in FIGS. 8A, 9 the laser source 10 has an identical downwardly turned V-groove shaped mounting member 73 and an adjustable 90° turning mirror 12.

Figure 1:
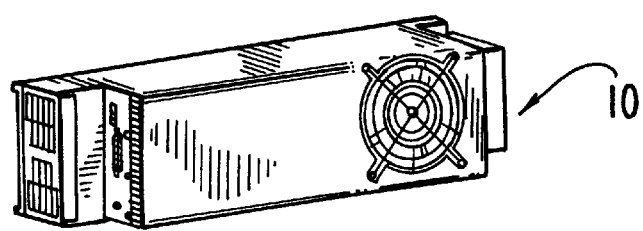
FIG. 1 is a perspective view of a laser source of the present invention.
Figure 2:
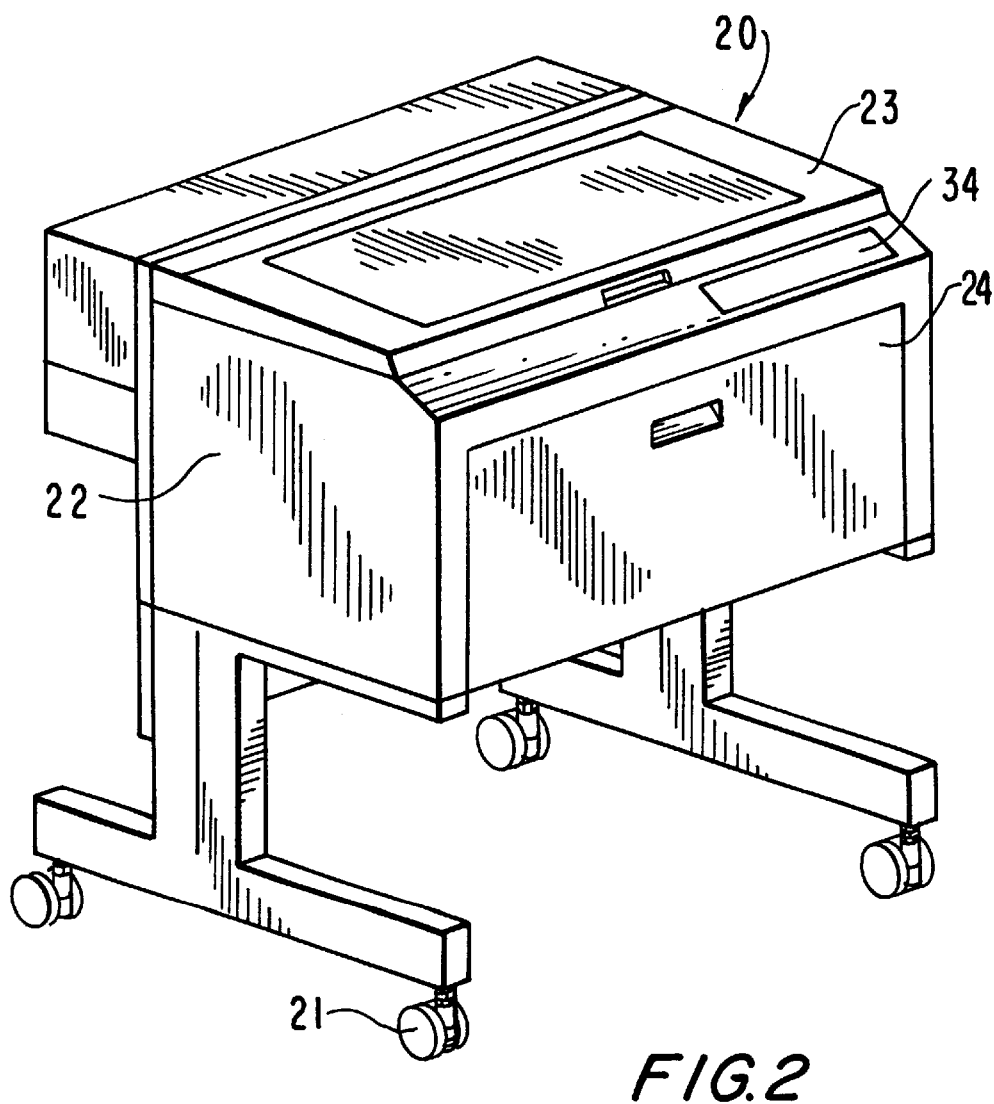
FIG. 2 is a perspective view of a laser material processing system of the present invention.
Figure 3:
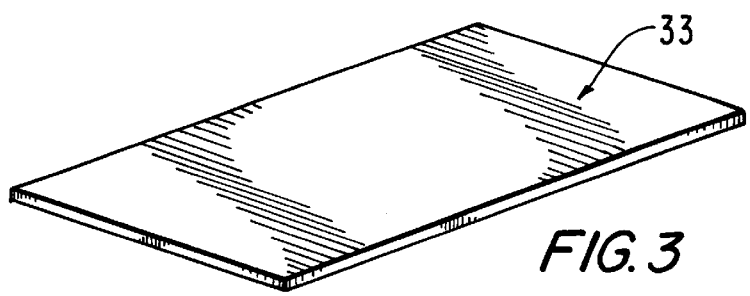
FIG. 3 is a perspective view of a table in the laser material processing system of FIG. 2.
Figure 4:
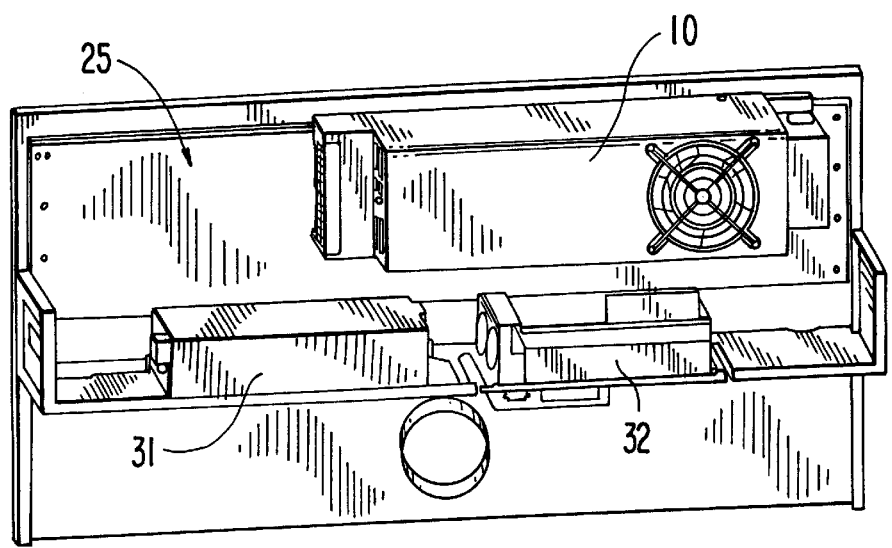
FIG. 4 is a perspective view of a main assembly in the laser material processing system of FIG. 2 which includes the laser cartridge of FIG. 1, a power supply module, and a CPU.
Figure 5:
FIG. 5 is a perspective view of a transverse rail and carriage in the laser material processing system of FIG. 2.
Figure 6:
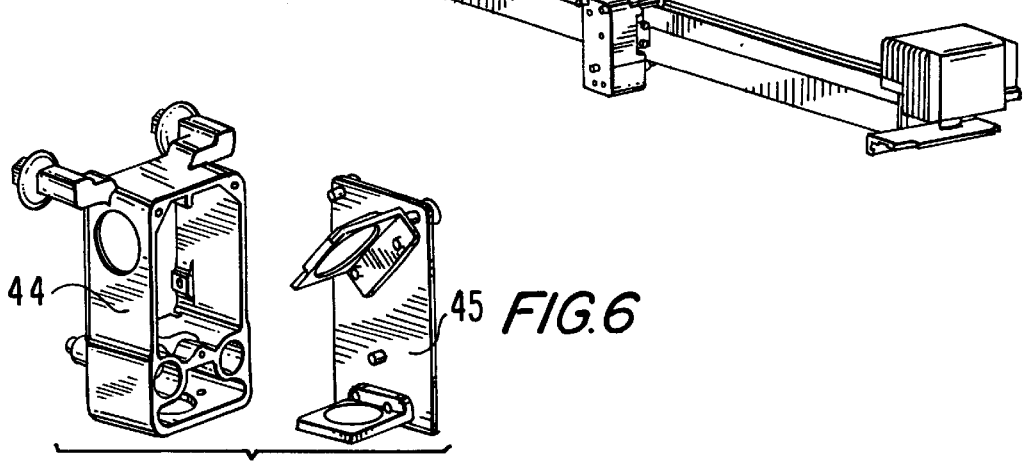
FIG. 6 is a perspective view of a mirror assembly which locks into the frame of the carriage in the laser material processing system of FIG. 2.

The upturned ridges 28, 29 of the mounting members 26, 27 on the prealignment fixture 60 (FIG. 8) or the upturned ridges 28, 29 of the laser material processing platform 20 (FIGS. 7, 10) receive the downwardly turned V-groove 73 of the laser simulator 72 (FIG. 8A) or the downwardly turned V-groove 73 of the laser source 10 (FIG. 9) for mounting the laser simulator 72 or the laser source 10 in operative relation on the mounting members 26, 27 of the pre-alignment fixture 60 (FIG. 8) or on the mounting members 26, 27 of the laser material processing platform 20(FIG. 2). This mounting method comprises one embodiment of a common mounting method of the present invention.

The purpose of the common mounting method is to enable a pre-alignment process which will allow any one of the laser sources and anyone of the laser material process platforms to be interchangeably interfaced.

As described in greater detail below, the mounting member of the laser material processing platform is used to establish a beam path of the pre-aligned laser or laser simulator mounted thereon, and the task is to then adjust the optical axis of the beam delivery system to the beam path of the pre-aligned laser source or laser simulator such that the beam path and optical axis coincide. In sum, the beam path of the laser source or laser simulator is first pre-aligned to a predetermined reference, and then the optical axis of the beam delivery system is pre-aligned to the pre-aligned beam path of the laser source or laser simulator such that the two coincide. In other words, we establish a benchmark (reference) in the laser source or laser simulator, and then adjust the beam delivery system of each platform to coincide with that benchmark. This process is performed with respect to each laser source and each beam delivery system in the line.

3. The Pre-Aligning Process

In operation the process of pre-aligning the laser source 10 and the laser material processing platform 20 according to the present invention is as follows:

A. Position the laser source 10 on the mounting location 66 using the common mounting method. Adjust the beam path 80 of the laser source 10 to align with the near 67 and far 71 field targets,
   1. Upon completion of step A, the laser source 10 may be interchanged with any other laser source 10 in the line as to which step A has also been completed with the assurance that additional alignment is not necessary. "Line" means a predetermined population of laser sources and laser material processing platforms.

B. Position the laser simulator 72 on the mounting location 66 using the common mounting method. Adjust the beam path 80 of the laser simulator 72 to align with the near 67 and far 71 field targets.

1. The laser simulator 72 is only necessary if the laser source 10 has an invisible beam. If the laser source 10 has a visible beam, the laser source 10 itself may be used as a tool referencing the pre-alignment fixture beam path 80 to pre-align any one or all of the laser material processing platforms 20 in the line.

Figure 7:
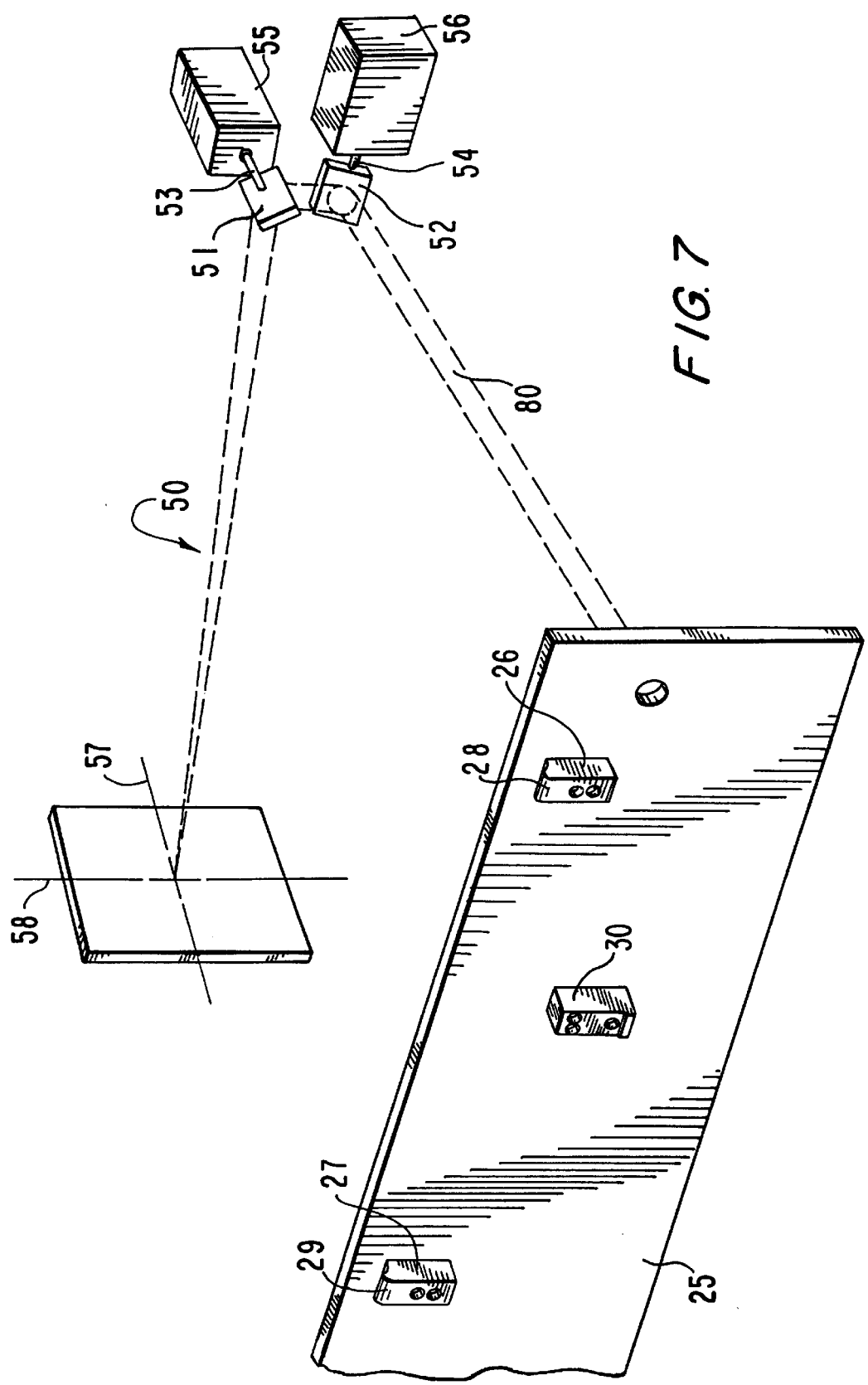
FIG. 7 is a schematic view of a Galvanometer X-Y scanner which is an alternative type beam delivery system which may be used in the laser material processing system of FIG. 2.

C. Position the laser simulator 72 (or the laser source 10 from step A if such source has a visible beam) on the mounting location 25 of the laser material processing platform 20 using the common mounting method, align the optical axis 90 of the X-Y beam delivery system 40 of the laser material processing platform 20 to the beam path 80 of the laser simulator 72. As seen in FIG. 10, one method of doing this adjustment is by adjusting the tracks 41, 42 about X, Y and Z axes until the optical axis 90 of the beam delivery system 40 coincides with the beam path 80 of the laser simulator 72 (or the laser source 10, if that is used instead) by using a mobile target (not shown) which clamps to the tracks 41, 42 and coincides with an optical axis 90 of the beam delivery system 40. As seen in FIG. 7, another method of doing this adjustment is by adjusting the mirrors 51, 52 and mirror axes 53, 54 as is well known in the art.

1. Upon completion of steps B and C or steps A and C, the laser material processing platform 20 may be interchanged with any other laser material processing platform 20 in the line as to which steps B and C or steps A and C have also been completed, with the assurance that additional alignment in not necessary.

2. Upon completion of steps A as to all laser sources 10 in the line and steps B and C or A and C as to all laser material processing platforms 20 in the line, any one laser source 10 in the line may be interfaced with any one laser material processing platform 20 in the line, with the assurance that when so interfaced with each other, they will be automatically in alignment.

It is readily apparent that the pre-alignment of the beam path of all of the laser sources in a line to a predetermined reference enables aligning the optical axis of any beam delivery system to coincide with one such laser source beam path with the assurance that said beam delivery system optical axis will coincide with the beam path of all laser sources in the line, and vice versa. Namely, the pre-alignment of the optical axis of all of the beam delivery systems in a line to a predetermined reference enables aligning the beam path of any laser source to coincide with one such beam delivery system optical axis with the assurance that said laser source beam path will coincide with the optical axis of all beam delivery systems in the line, and vice versa.

Thus, the method of the present invention enables the optical axis of a beam delivery system to coincide with the beam path of all laser sources in a line which have been pre-aligned to a predetermined reference by making the optical axis of said beam delivery system coincide with a beam path of one laser source in the line which has been pre-aligned to the predetermined reference, and vice versa. Namely, the method enables the beam path of a laser source to coincide with the optical axis of all beam delivery systems in a line which have been pre-aligned to a predetermined reference by making the beam path of the laser source coincide with the optical axis of one such beam delivery system in the line which has been pre-aligned to the predetermined reference, and vice versa.

The foregoing description of a preferred embodiment and best mode of the invention known to applicants at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of producing a laser material processing system including a laser material processing platform, the platform including a beam delivery system having an optical axis along which a laser beam is deliverable to a workpiece position, said method comprising:

a first step of providing a target in a pre-alignment fixture;

a second step of mounting a first laser on the pre-alignment fixture;

a third step of pre-aligning a first laser beam of the mounted first laser to impinge on the target;

after the first laser beam is pre-aligned, a fourth step of mounting the first laser on the platform; and a fifth step of pre-aligning the optical axis such that the beam delivery system delivers the pre-aligned first laser beam to the workpiece position, and such that a second laser whose second laser beam has been pre-aligned in accordance with said third step is mountable on the platform in accordance with said fourth step such that the second laser beam is delivered to the workpiece position without further substantial alignment.

2. The method of claim 1, wherein the pre-alignment fixture has a first laser mounting structure and the platform has a second laser mounting structure substantially identical to the first laser mounting structure.

3. The method of claim 1, further comprising the step of producing a second platform of a same kind as the first-mentioned platform using a laser that was pre-aligned in accordance with said third step to perform said fifth step on the second platform.

4. The method of claim 1, further comprising the step of producing a second platform of a different kind from the first-mentioned platform using a laser that was pre-aligned in accordance with said third step to perform said fifth step on the second platform.

5. The method of claim 1, wherein the first laser is of a same kind as the second laser.

6. The method of claim 1, wherein the first laser is of a different kind from the second laser.

7. A method of preparing a laser for use on a laser material processing platform that includes a beam delivery system having an optical axis along which a laser beam is deliverable to a workpiece position, said method comprising:

a first step of providing a target in a pre-alignment fixture;

a second step of mounting a laser on the pre-alignment fixture; and a third step of pre-aligning a laser beam of the mounted laser to impinge on the target, wherein the optical axis of the platform is pre-alignable such that, after the optical axis is pre-aligned, the laser whose laser beam has been pre-aligned in accordance with said third step is mountable on the platform axis such that the laser beam is delivered to the workpiece position without further substantial alignment.

8. The method of claim 7, wherein the pre-alignment fixture has a first laser mounting structure and the platform has a second laser mounting structure substantially identical to the first laser mounting structure.

9. A pre-alignment fixture for preparing a laser material processing system, the system including a laser material processing platform and a laser for use on the platform, the platform including a first mounting structure for mounting the laser, the platform further including a beam delivery system having an optical axis along which a laser beam is deliverable to a workpiece position, said fixture comprising:

a target;

a second mounting structure for mounting a light beam tool, said second mounting structure being substantially identical to the first mounting structure; and a pre-alignment structure for pre-aligning a beam of the light beam tool mounted on said second mounting structure to impinge on said target, wherein the optical axis of the platform is pre-alignable such that, after the optical axis is pre-aligned, a laser whose laser beam has been pre-aligned using said fixture is mountable on the platform such that the laser beam is delivered to the workpiece position without further substantial alignment.

10. The fixture of claim 9, wherein the light beam tool is a laser.

11. The fixture of claim 9, wherein the light beam tool is a laser beam simulator tool.

* * * * *